United States Patent
Little

(10) Patent No.: US 7,558,250 B2
(45) Date of Patent: Jul. 7, 2009

(54) SYSTEMS AND METHODS FOR WIRELESS COMMUNICATIONS VIA SATELLITE

(75) Inventor: John R. Little, Chelmsford (GB)

(73) Assignee: Aeromobile, Ltd., West Sussex (GB)

( * ) Notice: Subject to any disclaimer, the term of this patent is extended or adjusted under 35 U.S.C. 154(b) by 1065 days.

(21) Appl. No.: 10/834,170

(22) Filed: Apr. 29, 2004

(65) Prior Publication Data

US 2005/0201318 A1    Sep. 15, 2005

Related U.S. Application Data

(60) Provisional application No. 60/552,212, filed on Mar. 12, 2004.

(51) Int. Cl.
*H04L 12/66* (2006.01)

(52) U.S. Cl. ............. 370/352; 370/316; 370/331; 455/423; 455/427; 455/452.2

(58) Field of Classification Search ............. 455/423, 455/466, 427, 429, 12.1, 13.4; 370/316, 370/331

See application file for complete search history.

(56) References Cited

U.S. PATENT DOCUMENTS

| | | | |
|---|---|---|---|
| 6,137,783 A * | 10/2000 | Sallberg | 370/316 |
| 6,928,289 B1 * | 8/2005 | Cho et al. | 455/452.2 |
| 2002/0013149 A1 * | 1/2002 | Threadgill et al. | 455/427 |
| 2003/0013465 A1 * | 1/2003 | Choong et al. | 455/466 |
| 2003/0100299 A1 * | 5/2003 | Ko et al. | 455/423 |

* cited by examiner

*Primary Examiner*—Curtis Kuntz
*Assistant Examiner*—Phung-Hoang J Nguyen
(74) *Attorney, Agent, or Firm*—Oliff & Berridge, PLC

(57) ABSTRACT

A method for communicating between an airborne mobile terminal and a terrestrial location via satellite, wherein the satellite communication channel is provided by an integrated services digital network (ISDN) connection for the voice data, and mobile packet data system (MPDS) connection for the signaling data. The ISDN connection is automatically disabled when no voice data is being transmitted, and multiple voice calls are multiplexed on a single ISDN channel.

10 Claims, 6 Drawing Sheets

SYSTEMS AND METHODS FOR WIRELESS COMMUNICATIONS VIA SATELLITE

This nonprovisional application claim the benefit of U.S. Provisional Application No. 60/552,212 filed Mar. 12, 2004.

BACKGROUND OF THE INVENTION

1. Field of Invention

This invention relates to systems and methods for communication between an airborne wireless terminal and a terrestrial location, wherein the communication occurs via satellite or terrestrial link.

2. Description of Related Art

Business travelers increasingly travel with both a cell phone and a laptop computer in order to improve the productivity of the time spent while traveling. A growing number of cell phone users are requiring wireless connectivity to networks in order to have data communicated to a display on a web-enabled cell phone. Therefore, cell phones are bundled with personal digital assistants that can communicate both with voice and data.

Communication links presently exist that can handle voice communications, as well as digital data, by sampling a voice signal and digitizing it. For example, the integrated services digital networks (ISDN) was originally conceived to transmit digitized voice.

The Inmarsat Swift 64 is a satellite transceiver system, specified and operated by Inmarsat Ltd. of London, England, which can provide communications between an airborne aircraft and a remote network. The Inmarsat Swift 64 transmits communication signals to and from a satellite on dedicated, 64 kbps bandwidth channels. The Inmarsat Swift 64 can handle both voice and data simultaneously through ISDN and data only via the Mobile Packet Data System (MPDS). Presently, however, the ISDN channel is used to transmit user data, even when no voice call is present, which is a very inefficient use of bandwidth. Furthermore, each ISDN channel can only be used to transmit at most, two voice calls at one time. A device is needed which can improve the efficiency of use of the ISDN channels available on board aircraft and other mobile platforms.

SUMMARY OF THE INVENTION

The Inmarsat Swift 64 can provide data transmission using Mobile Packet Data System (MPDS) and voice transmission using an Integrated Services Digital Network (ISDN). According to this invention, the MPDS channel is used to send only signaling information from the mobile terminals carried by the passengers when no calls are in place by the passengers. This removes the need keep an ISDN channel set up to send only data. When the passenger places a call on his mobile terminal, the call will be multiplexed along with up to seven other voice calls into a single ISDN connection along with the signaling data. When the last call from a mobile terminal is disconnected, the system will revert back to the use of MPDS for signaling. MPDS mode is less expensive for the transmission of data, which tends to occur in bursts, because charges are accrued based only of the amount of data transmitted, and not based on the connect time. In contrast, the ISDN channel is more efficient for the transmission of voice data, because (a) it charges based on the duration of the call, not on the amount of data transmitted, and (b) does not carry the overhead of a packetized system.

The Inmarsat Swift 64 is connected to the mobile terminals via a base transceiver station (BTS) that provides the wireless communication links within the aircraft cabin to and from the mobile terminals. Each BTS can support up to seven separate mobile terminals.

The basic rate ISDN connection uses a 2B+D channel, wherein the B channel (the "bearer" channel) transmits the user data and the D channel (the "data" channel) is used for signaling, for example for call setup and closure. A single B channel is capable of transporting 64 kbps with a standard Inmarsat global access node (GAN) terminal, and the D channel is an additional 16 kbps, so that a single 2B+D ISDN channel has a total bandwidth of 144 kbps.

Voice communication could occur using the real time protocol (RTP) over user datagram protocol over Internet protocol (UDP/IP) protocol, wherein the voice data is packetized and sent with an IP header over the wireless links, to the satellite, and then transmitted to the terrestrial access node (TAN) to the Internet or the public switched telephone network (PSTN). However, this protocol is very inefficient, as at least 40 bytes of header is required for every 20 bytes of voice data, so that to transmit an 8 kbps voice signal would require a bandwidth of 24 kbps. Therefore, a single B channel of ISDN running IP/UDP/RTP to transport voice could support a maximum of two voice channels.

This invention provides systems and methods that increase the transport capability of the satellite transceiver system to handle some or all of the voice channels supported by the BTS, which is at present seven.

To have a complete ISDN channel running when no voice calls are in place is very inefficient and costly. This invention separately provides systems and methods that improve the efficiency of the communications over the ISDN channel.

This invention separately provides systems and methods that improve the efficiency of a mobile terminal system when connected to a satellite transceiver station that can operate in both ISDN and MPDS modes.

This invention separately provides systems and methods for communications via a satellite with a satellite transceiver station, wherein the communication mode is switched between ISDN and MPDS depending on the status of the call.

This invention separately provides systems and methods for communications via a satellite with a satellite transceiver station that automatically switches into ISDN mode for setting up a call.

This invention separately provides systems and methods for communications via a satellite with a satellite transceiver station that automatically switches into ISDN mode and use the spare ISDN bandwidth to transmit signaling information.

This invention separately provides systems and methods for communications via a satellite with a satellite transceiver station that divides the ISDN channel into 8 kbps time slots and use one or two time slots to transmit a single voice call.

This invention separately provides systems and method for communications via a satellite using the spare bandwidth of the ISDN connection to transmit additional voice calls.

This invention separately provides systems and methods that automatically disconnect the ISDN channel and set up a MPDS connection when no other voice calls are present.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The following detailed description of various exemplary embodiments of the mobile platform communications systems and methods according to this invention refer to one specific type of mobile platform communications system, an airborne mobile platform communications system, for the sake of clarity. However, it should be appreciated that the principles of this invention, as set forth below, can be equally applied to any known or later-developed mobile platform communications system, as well as a mobile device, such as, for example, maritime and terrestrial mobile devices, such as ships, boats, buses, trains, trucks, and the like, beyond the airborne mobile platform communications system specifically discussed herein.

Various exemplary embodiments of this invention pertain to systems and methods for efficiently communicating between a mobile terminal on board an aircraft and a ground location, such as a fixed location. In one exemplary embodiment of this invention, a terminal adapter identifies the incoming signal from a mobile terminal as the initiation of a voice call, and activates an ISDN communications channel between the terminal adapter and an orbiting satellite. The terminal adapter then extracts the voice call data and places it into a single 8 kbps time slot which is then transmitted by the terminal adapter over the ISDN channel. The spare time slots are used to transmit signaling data coming from the mobile terminal and/or other voice calls coming from other mobile terminals in communication with the terminal adapter. When a disconnect signal is received from the mobile terminal, and no other calls are currently underway, the terminal adapter automatically disconnects the ISDN channel and activates the MPDS channel. Any additional signaling or data transmission occurs over the MPDS channel. Various exemplary embodiments of this invention thereby significantly improve the efficiency with which the ISDN channel is used.

Figure 1:
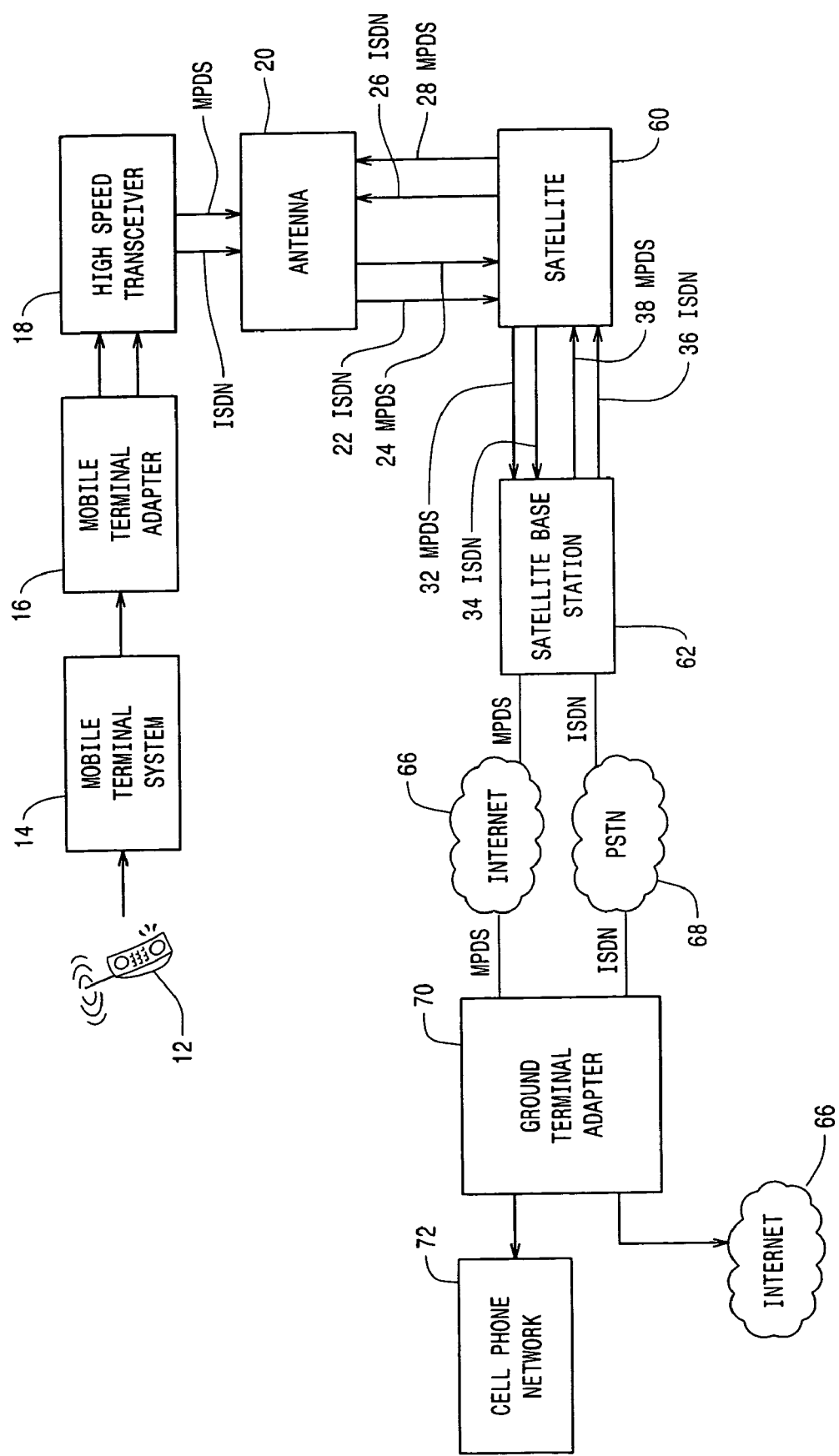
FIG. 1 is a block diagram of an exemplary embodiment of a mobile platform communications system, showing an overall system architecture according to this invention.

FIG. 1 shows a high level functional block diagram of the components of a mobile platform communication system 10 according to an exemplary embodiment of this invention. A mobile terminal 12 is in communication with a mobile terminal system 14, which receives the radio frequency communications transmitted by the mobile terminal 12. In various exemplary embodiments, the mobile terminal 12 may be a cell phone, for example, operated by a passenger. However, it should be appreciated that the mobile terminal 12 is, in various exemplary embodiments, any form of a user workstation, communication system or personal electronic device, such as a personal digital assistant (PDA), that communicates wirelessly with the mobile terminal system 14. The mobile terminal 12 may be a cell phone or a personal digital assistant carried on board by a passenger or a member of the flight crew, or by maintenance personnel. In still other exemplary embodiments, the mobile terminal 12 may be provided within the aircraft in a dedicated manner for repeated use by subsequent passengers or crew of the aircraft while on board.

The mobile terminal 12 signals to the mobile terminal system 14 that a voice call is pending, and requests a transmission channel from the mobile terminal system 14. The mobile terminal system 14 provides the interface which translates the radio frequency signals into electrical impulses, which are then transmitted to a mobile terminal adapter 16. There may be multiple mobile terminals 12 on board a single aircraft, each communicating with the single mobile terminal adapter 16, also installed on the aircraft. The mobile terminal adapter 16 may be designed to handle a plurality of mobile terminals 12 in communication therewith at a given time. The mobile terminal adapter 16 divides the electrical signal into signals associated with a voice call, and signals which are purely data transmissions. The data transmissions are transmitted in packets to a high speed transceiver global access node (GAN) 18, for example, using MPDS. The mobile terminal adapter 14 also initiates an ISDN connection through the high speed transceiver 18, over which the signals associated with the voice call are transmitted.

The high speed transceiver 18 prepares the ISDN and MPDS signals for transmission to an orbiting satellite 60, via an antenna 20 installed on the aircraft. The transmission occurs via uplink communications paths 22 and 24, wherein the uplink path 22 carries the ISDN signal "up" to the orbiting satellite 60, and the uplink path 24 carries the MPDS signal "up" to the orbiting satellite 60. The high speed transceiver 18 may receive signals from the satellite 60 via downlink communications paths 26 and 28, wherein the downlink path 26 carries the ISDN signal "down" to the aircraft and the downlink path 28 carries the MPDS signal "down" to the aircraft.

In various exemplary embodiments, the antenna 20 is a tail mounted antenna sub-system (TMASS). In various other exemplary embodiments, the antenna 20 is conformal to the fuselage of the aircraft and/or is electronically or mechanically steered.

In various exemplary embodiments, the high speed transceiver 18 includes an airborne integrated transceiver router (AITR) and an antenna control unit (ACU) which are sufficiently small to fit in the limited space and able to operate under the limited power available on an executive aircraft or other small commercial or private aircraft. In various other exemplary embodiments, the high speed transceiver 18 may be a device such as the Inmarsat Swift 64, described above. In various exemplary embodiments, the high speed transceiver 18 does not handle MPDS and ISDN data simultaneously. The high speed transceiver 18 may first process the ISDN data followed by the MPDS data. In other exemplary embodiments, the ISDN data is processed simultaneously with the MPDS data.

In various exemplary embodiments, the high speed transceiver 18 is located as close as possible to the antenna 20 in order to reduce losses in cabling used to connect the high speed transceiver 18 to the antenna 20.

The orbiting satellite 60 receives the transmission from the high speed transceiver 18. The orbiting satellite 60 then transmits the data to a ground-based satellite base station 62. The communications between the orbiting satellite 60 and the base station 62 take place along uplink paths 32 and 34, which carry the ISDN and MPDS signals, respectively, "up" from the base station 62 to the satellite 60. Downlink paths 36 and 38 carry ISDN and MPDS signals, respectively, "down" from the orbiting satellite 60 to the base station 62.

Although the satellite 60 is typically at a higher altitude than both the aircraft antenna 20 and the base station 62, this is not necessarily the case. Thus, in various exemplary embodiments, the aircraft antenna 20 may be at a higher altitude than the satellite 60. An example of an aircraft in such an embodiment is a spacecraft. Thus, the references to an uplink communications path and a downlink communications path are not intended to describe a necessary positional relationship, such as altitude, between the components. Rather, references to an "uplink" or "downlink" are intended to be symbolic references.

The base station 62 then transmits the MPDS data to the Internet 66 or other appropriate network depending on the address contained in the header of the MPDS data packet. The base station 62 also transmits the data associated with the voice call to a public switched telephone network 28 (PSTN), for example, along which the voice call is routed using the ISDN protocol. The signals from the Internet 66 and the PSTN 28 are received by a ground terminal adapter 70. The ground terminal adapter 70 re-assembles the voice data and signaling data into the proper protocols, for example, the Global Systeme Mobile (GSM), and transmits the re-assembled data to a cell phone network 72. For data which is not associated with the voice call, the ground terminal adapter 70 routes the MPDS/ISDN data back to the Internet 66.

Although the exemplary embodiment depicted in FIG. 1 shows only a single mobile terminal 12, it should be apparent that other embodiments exist wherein a plurality of mobile terminals are in communication with a mobile terminal system 14 and mobile terminal adapter 16. Similarly, although FIG. 1 shows only a single high speed transceiver 18 in communication with the satellite 60, it should be apparent that multiple high speed transceivers, each installed on a corresponding aircraft, may simultaneously be in communication with the orbiting satellite 60.

Figure 2:
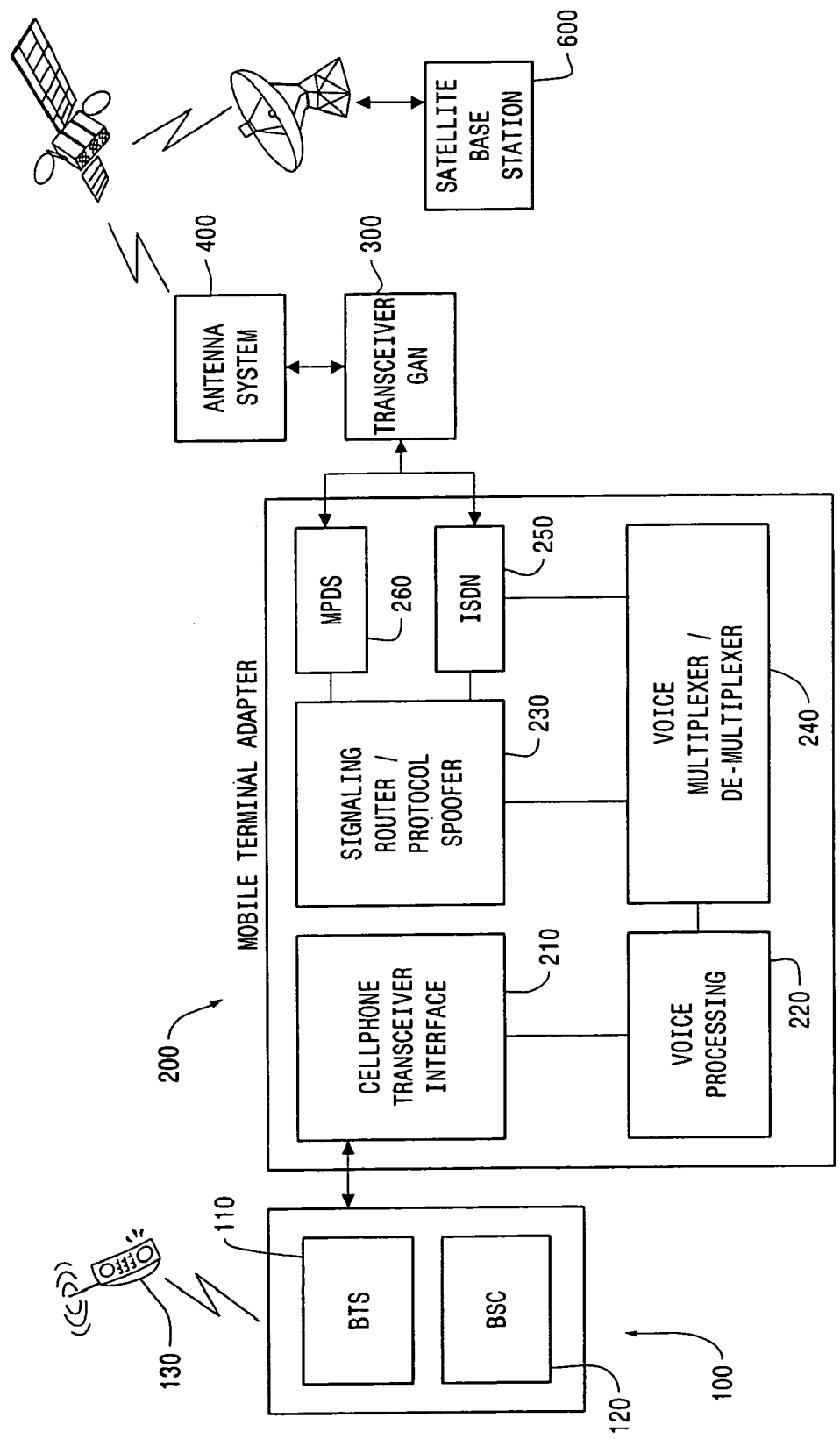
FIG. 2 is a block diagram showing greater detail of the mobile terminal adapter shown in FIG. 1, according to an embodiment of this invention.

FIG. 2 shows a functional block diagram of the mobile terminal system 100 and the mobile terminal adapter 200 in greater detail, according to an exemplary embodiment of this invention. As shown in FIG. 2, the mobile terminal system 100 comprises a base transceiver station (BTS) 110 and a base station controller (BSC) 120. The base transceiver station 110 receives the signal from the mobile terminal 130, and translates the radio frequency signals into electrical impulses that are interpreted by the base station controller 120. Each base transceiver station 110 can manage up to seven mobile terminals simultaneously, for example, for GSM. The mobile terminal 130 may transmit a message, for example, a request to initiate a voice call to a given number. The base station controller 120 may reply to the mobile terminal 130, via the base transceiver station 110, instructing the mobile terminal 130 at what frequency to encode the voice data. Most mobile terminals are capable of transmitting the voice data at enhanced full rate (16 kbps), full rate (16 kbps) and half rate (8 kbps). The base station controller 120, for example, may instruct the mobile terminal 130 to transmit the voice data in half rate format (8 kbps).

According to FIG. 2, the mobile terminal adapter 200 may include a mobile terminal transceiver interface 210, a voice processing unit 220 and a signaling router/protocol spoofer 230. The base transceiver station 110 will then transmit the voice call in voice over IP (VoIP) format, at 8 kbps, to the mobile terminal transceiver interface 210 of the mobile terminal adapter 200. The half rate format voice data is received by the mobile terminal transceiver interface 210, which routes the data to the voice processing unit 220 and the signaling router/protocol spoofer 230 of the mobile terminal adapter 200.

In various exemplary embodiments, the mobile terminal adapter 200 may be an arbitrary collection of functions rather than a single function or apparatus as shown in FIG. 2. Therefore, the functionality of the mobile terminal adapter 200 in such exemplary embodiments may be provided in a single housing or enclosure, within discrete housings or enclosures, or within a combination of housings.

It should be appreciated that, in various exemplary embodiments, the mobile terminal adapter 200 can be implemented as software executing on a programmed general purpose computer. Likewise, the mobile terminal adapter 200 can also be implemented on a special purpose computer, a programmed microprocessor or microcontroller and peripheral integrated circuit elements, and ASIC or other integrated circuit, a digital signal processor (DSP), a hardwired electronic or logic circuit, such as a discrete element circuit, a programmable logic device, such as a PLD, PLA, FPGA or PAL, or the like. In general, any device that is capable of implementing the functionality disclosed herein can be used to implement the mobile terminal adapter 200. Each of the various signal lines outlined above in FIG. 2 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above with respect to FIG. 2.

It should be understood that each of the circuits, routines, units, applications, modules or the like outlined above with respect to FIG. 2 can be implemented as software that is stored on a computer-readable medium and that is executable on a programmed general purpose computer, a programmed special purpose computer, a programmed microprocessor, a programmed digital signal processor or the like. Such a computer-readable medium includes using a carrier wave or the like to provide the software instructions to a processing device. It should also be understood that each of the circuits, routines, units, applications, objects, procedures, managers and/or modules outlined above with respect to FIG. 2 can be implemented as portions of a suitably programmed general purpose computer. Alternatively, each of the circuits, routines, units, applications, objects, procedures, managers and/or modules shown in FIG. 2 can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, units, applications, objects, procedures, managers and/or modules shown in FIG. 2 will take is a design choice and it will be obvious and predictable to those skilled in the art. It should be appreciated that the circuits, routines, units, applications, objects, procedures, managers and/or modules shown in FIG. 2 do not need to be of the same design.

It should be appreciated that a routine, a unit, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device. These steps can be performed by a computer executing the instructions that define the steps. Thus, the terms "routine", "unit", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing described with respect to FIG. 2 can be performed by a computer executing one or more appropriate programs, by special purpose hardware designed to perform the method, or any combination of such hardware, firmware and software elements.

An Ethernet connection may be used to convert the rate/format information from the mobile terminal transceiver interface 210 into a form expected by the signaling router/protocol spoofer 230. A first function of the signaling router/protocol spoofer 230 is to receive certain signaling messages from the mobile terminal system 100, and to generate the appropriate responses, thereby mimicking the operation of a terrestrial network. By generating the appropriate responses for the mobile terminal system 100, the mobile terminal system 100 is fooled into thinking that the signaling was transmitted to the ground station and responded to by the ground station. Such signals are transmitted routinely, such as every 5 minutes or 10 minutes during a normal voice call, to update the terrestrial network as to the location of the mobile terminal, or to authenticate the identity of the mobile terminal. A function of the spoofer 230 is therefore to reduce or eliminate redundant or unnecessary signaling which must be transmitted over the MPDS channel. This improves the efficiency of the overall communications system. However, the inclusion of the spoofer 230 functionality is optional.

A second function of the signaling router/protocol spoofer 230 is to automatically switch the cell phone signaling between the MPDS and ISDN connections, depending on the call status. For example, for the GSM signaling standard, all signaling prior to and after the BSSMAP Page <IMSI> (uplink call)/RIL3-CC Setup (Call information) (Downlink call) and the BSSMAP Clear Complete, respectively, would be routed using MPDS. The signaling router/protocol spoofer 230 will also pass details of the arrangement of the voice data within the ISDN B channel by a voice multiplexer/demultiplexer 240 to the ground terminal adapter 70, as is described below. The signaling router/protocol spoofer 230 then arranges to have any additional bandwidth available in the MPDS or ISDN connection to be used for any additional signaling or data received from the mobile terminal system 100.

The mobile terminal transceiver interface 210 also transmits the voice over IP data to the voice processing unit 220. The voice processing unit 220 strips the voice data from the IP headers to produce just voice data.

The voice processing unit 220 then transmits the 8 kbps or 16 kbps voice data to the voice multiplexer/demultiplexer 240. The voice multiplexer/demultiplexer 240 will generally arrange the voice data produced by the voice processing unit 220 into either one or two time slots in the ISDN B channel. Although the GSM standard half rate 8 kbps encoding scheme is used in this exemplary embodiment, any voice codec producing a stream less than or equal to 8 kbps would be placed in a single time slot by the voice multiplexer/demultiplexer 240, and any stream greater than 8 kbps and less than 16 kbps would be padded by the voice processing unit 220 into a 16 kbps data stream and multiplexed into two of the eight 8 kbps timeslots in the ISDN B channel using the voice multiplexer/demultiplexer 240. The 16 kbps data is divided into two 8 kbps time slots for further transmission. Optionally the voice multiplexer/demultiplexer unit 240 can retranscode the higher voice data to a lower rate such that it will pass over a single 8 kbps timeslot.

The unused time slots can be used to handle additional voice calls (up to seven) or signaling data which may or may not be associated with the given voice call. These additional voice calls are handled in the same way, until the voice multiplexer/demultiplexer 240 has assembled a continuous, complete stream (64 kbps) to fill a B channel of the ISDN connection.

In addition to the voice data corresponding to the voice call, additional data is transmitted over the ISDN connection, which contains information on how the voice call is to be reconstructed from the transmitted time slots. The additional information will be used by the signal combiner/splitter 930 in the ground terminal adapter 900 to reconstruct the voice call.

An ISDN unit 250 receives the data from the voice multiplexer/demultiplexer 240, and an MPDS unit 260 receives the signaling information from the signaling router/protocol spoofer 230. The ISDN unit 250 and the MPDS unit 260 then transmit the ISDN and MPDS data, respectively, to a high speed transceiver global access node (GAN) 300 for encoding into a radio frequency waveform that will be transmitted to a satellite 500 by an antenna system 400. The MPDS unit 260 may transmit information via Ethernet using point-to-point protocol over Ethernet (PPPoE), or RS232, or some other means consistent with the capabilities of the high speed transceiver 300. The MPDS unit 260 may also keep track of the volume of transmitted data, in order to charge the user for the services. The ISDN unit 250 will transmit the ISDN data over the usual four-wire ISDN connection to the high speed transceiver GAN 300. The ISDN unit 250 may also keep track of the connect time for the ISDN channel, in order to charge the user for the connect time.

The high speed transceiver 300 then prepares the data for transmission to the satellite 500 via the antenna system 400. The high speed transceiver GAN 300 generates the proper waveform and applies the waveform to the antenna system 400, which may be installed on the fuselage of the aircraft. In this exemplary embodiment, the high speed transceiver 300 does not simultaneously handle both MPDS data and ISDN data. Thus, the MPDS and ISDN data are sequentially transmitted to the antenna system 400. The antenna system 400 then transmits the signal to the satellite 500, for example, in a geosynchronous orbit.

Figure 3:
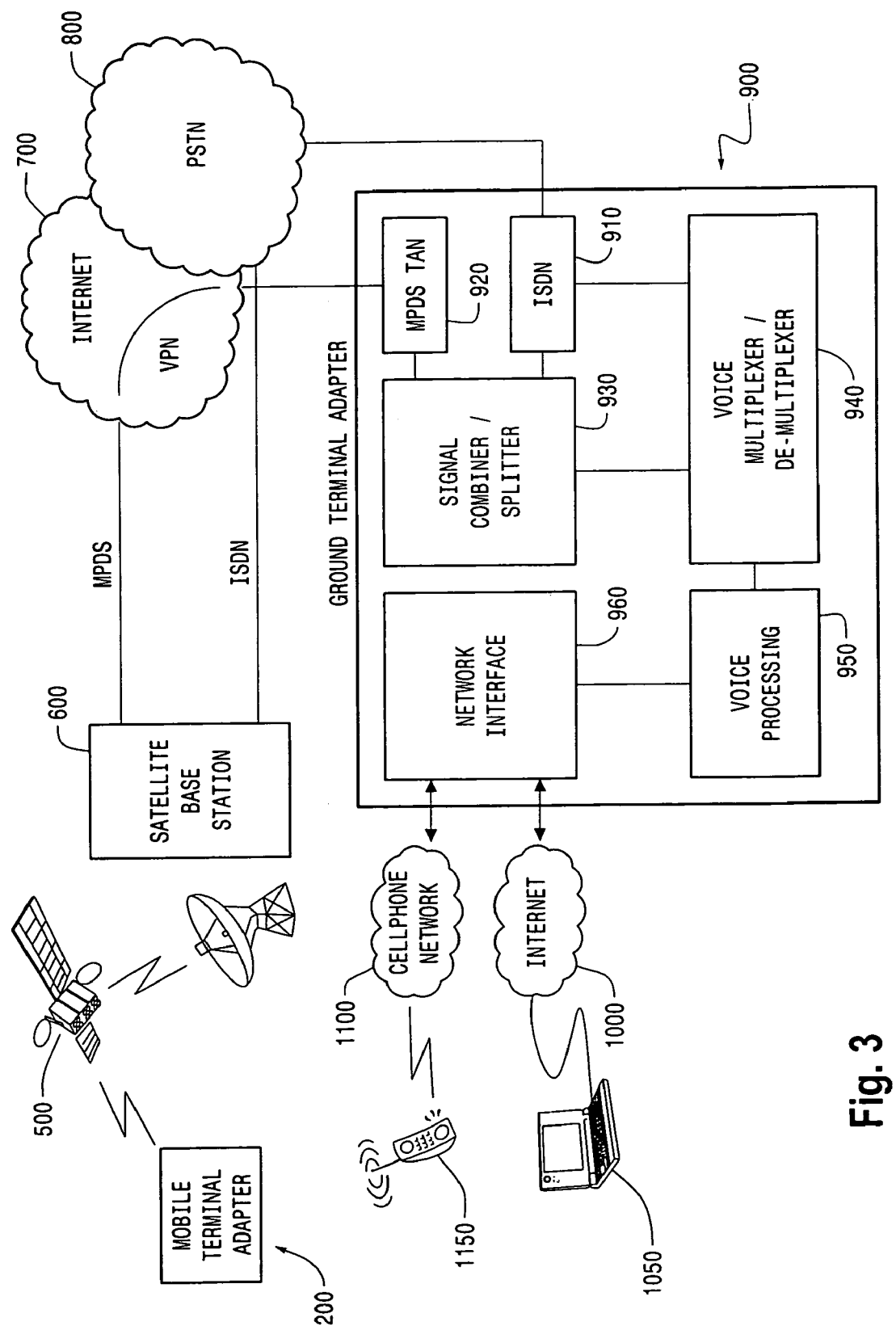
FIG. 3 is a block diagram showing greater detail of the ground terminal adapter shown in FIG. 1, according to an embodiment of this invention.

FIG. 3 shows a block diagram of an exemplary ground terminal adapter 900 that handles the signal transmitted by the satellite 500, via a satellite base station 600, and directs the signal to its terrestrial destination, such as a mobile terminal 1150 connected to a cell phone network 1100 or a computer 1050 connected to the Internet 1000. In this exemplary embodiment, the destination of the signal is the second mobile terminal 1150 in communication with the cell phone network 1100.

The satellite 500 receives the signal transmitted by the aircraft antenna system 400, and re-transmits the signal to the satellite base station 600, located in one of a number of terrestrial locations and operated by any of a number of satellite networking companies and equipped to handle both MPDS and ISDN data. The satellite base station 600 receives both the MPDS data and the ISDN data. The satellite base station 600 transmits the MPDS data to the Internet 700, or other appropriate computer network, such as a corporate WAN or LAN, depending on the IP address included in the header of the MPDS data packet. The connection to the Internet 700 may be over a virtual private network (VPN) that ensures the security of the data from eavesdropping by unintended recipients. The satellite base station routes the ISDN data directly to a public switched telephone network 800 (PSTN) which then handles the call as it would any other of terrestrial origin.

As shown in FIG. 3, the ground terminal adapter 900 is connected to both the Internet 700 to receive MPDS data and to the public switched telephone network 800 (PSTN) to receive the ISDN signals. The ground terminal adapter 900 performs the reverse function of the mobile terminal adapter 200 of FIG. 2, i.e., re-combining the ISDN signals and MPDS data which were sent over separate ISDN and MPDS channels, respectively. The ISDN data is received by an ISDN modem 910 in the ground terminal adapter 900 and the MPDS data is received by an MPDS receiver 920 in the ground terminal adapter 900. The ground terminal adapter 900 may be a shared resource, including up to, for example, 50 ISDN modems. The MPDS receiver 920 may also include firewalls, or other security measures taken to bar unauthorized entry.

The ISDN modem 910 transmits the voice data to both a signal combiner/splitter 930 and a voice multiplexer/demultiplexer 940. The voice multiplexer/demultiplexer 940 retrieves the 8 kbps or 16 kbps data from the appropriate time slots in the B channel of the ISDN signal. The voice multiplexer/demultiplexer 940 then transmits the demultiplexed data to a voice processing unit 950 that removes the padded bit reversals (if any) from the data signal and provides the voice signal at the half rate (8 kbps) or full rate (16 kbps) to a network interface 960. The voice processing unit 950 may also include a transcoding rate adapter unit (TRAU, not shown), which transcodes the voice signal into a 64 kbps pulse code modulation (PCM) signal conforming to the PCM format standards in place for the public switched telephone network (PSTN). This additional functionality may be required if the voice call is to be transmitted to the cell phone network via the PSTN.

The signal combiner/splitter 930 then includes the signaling associated with the ISDN call, but transmitted over the MPDS channel, with the data stream in the appropriate format, for the Global Systeme Mobile (GSM) standard, for example, or for any other cell phone signaling standard. The reconstructed signal is delivered to the network interface 960 from the signaling combiner/splitter 930 and voice processing unit 950 and transmitted in proper GSM format to the cell phone network 1100. This signaling routed to the signal combiner/splitter 930 may include call setup commands or call disconnect commands, for example. The signal combiner/splitter 930 also divides the ISDN data into signaling inserted into the ISDN signal to make use of the spare bandwidth, but not otherwise associated with a voice call. These signals, which are transmitted by the ISDN connection but are not associated with a voice call will be routed to the Internet 1000 by the network interface 960.

The network interface 960 then transmits the data in half rate format or full rate format into the cell phone network and on to the destination mobile terminal 1150 (or landline number), via the public switched telephone network (PSTN). If the MPDS data received over the MPDS connection is not associated with a voice call, the network interface routes this data to the Internet 1000 according to the destination address included in the header of the IP data packet. Similarly, IP data received over the ISDN connection but not associated with the ISDN voice call are routed over the Internet 1000, as described above.

Figure 4:
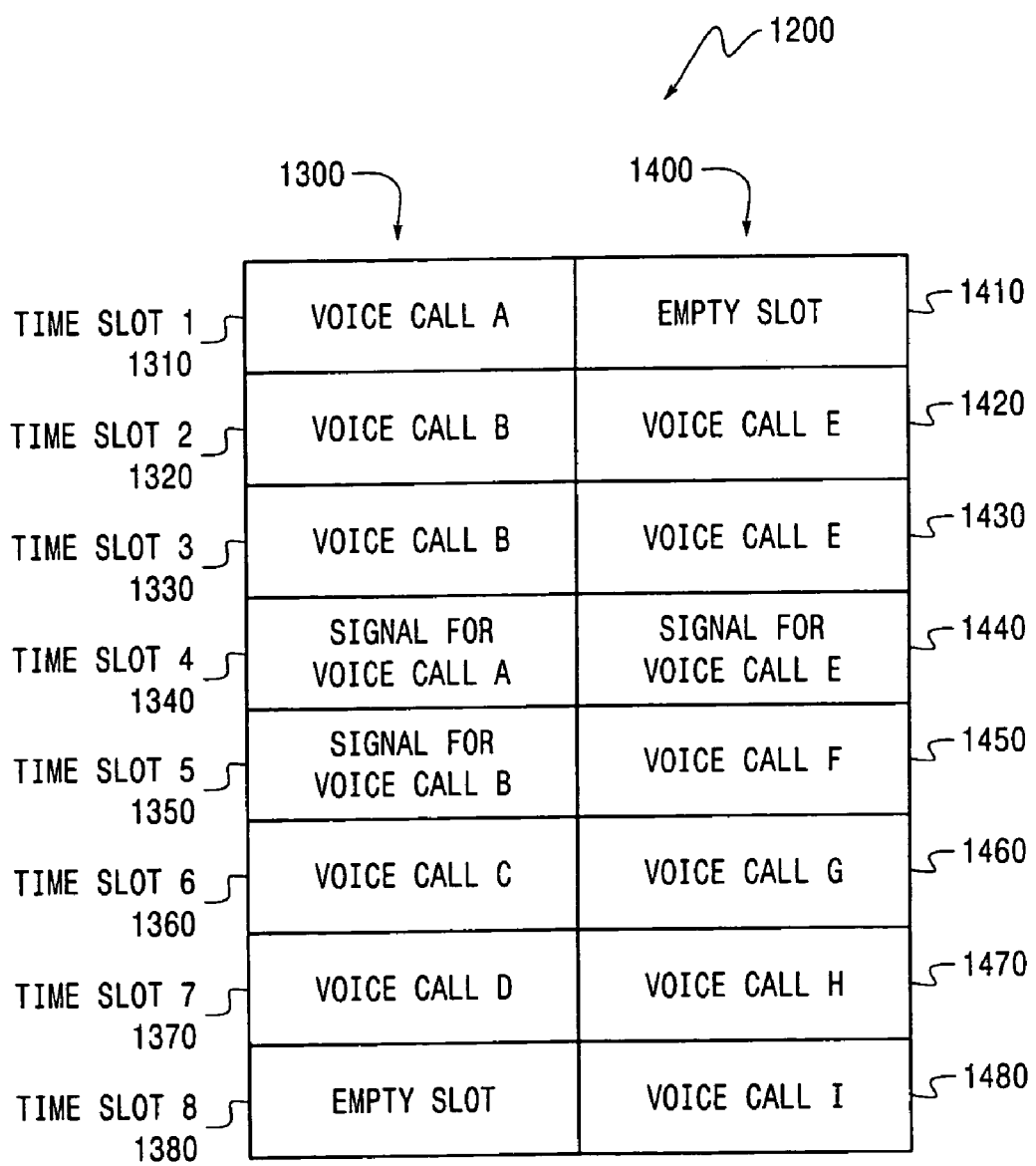
FIG. 4 is a block diagram illustrating the format of a frame of ISDN data.

FIG. 4 is a diagram depicting the structure and format of an exemplary frame 1200 of data assembled by the signal combiner/splitter 930 for transmission over the ISDN connection to the satellite. Each of the two channels shown, 1300 and 1400, is a bearer channel with a total bandwidth of 64 kbps. Each 64 kbps channel is divided into 8 kbps time slots 1310 through 1380 and 1410 through 1480, respectively, as shown in FIG. 4.

The diagram shown in FIG. 4 assumes a single ISDN channel with two 64 kbps bearer channels. However, this diagram is exemplary only, and it should be understood that any number of other communications standards may be used to practice this invention.

In the exemplary embodiment depicted in FIG. 4, four separate voice calls are handled by the first bearer channel 1300, and are designated as voice calls A-D. Five additional voice calls, designated calls E-I, are handled by the second bearer channel 1400. The signals corresponding to each of the voice calls are multiplexed into the data stream, according to a time-dependent-multiple-access (TDMA) scheme well known in the art. The first voice call A is received by the cell phone transceiver interface and transmitted to the voice processing unit and the voice multiplexer/demultiplexer. The voice processing unit strips the voice data from the IP headers, as described above, and pads (if required) with bit reversals to achieve a data rate of 8 kbps. The 8 kbps data is arranged in the time slot 1310.

The second voice call B is similarly processed, except that voice call B originates from a cell phone supporting only full rate format (e.g. greater than 8 kbps). This voice data is received by the voice processing unit, stripped from the IP headers, and padded with bit reversals (if required) to achieve a data rate of 16 kbps. The 16 kbps data is arranged into two time slots 1320 and 1330, as shown in FIG. 4. Alternatively, the voice data from voice call B could have been transcoded into half rate format by the voice processing unit, and transmitted in a single 8 kbps timeslot.

Signaling data associated with voice call A is also received by the cell phone transceiver interface and transmitted to the signaling router/protocol spoofer. This data is also sent to the voice multiplexer/demultiplexer, which arranges the data in the third time slot 1340. Time slot 1350 may contain data related to voice call B. The data may indicate to the signaling combiner/splitter of the ground terminal adapter 900, how to reconstruct calls A and B from the data transmitted in the earlier time slots 1310-1330.

Time slots 1360 and 1370 are filled with voice data associated with voice calls C and D, respectively, and the last time slot 1380 remains empty. The voice multiplexer/demultiplexer has thereby assembled a fill frame of data for the first bearer channel 1300. It should be understood that the scenario described above is exemplary only, and any number of voice calls, up to eight, may be handled by the voice multiplexer/demultiplexer along with any number of empty slots or signal slots filled with data corresponding to signaling associated with a given call.

The second bearer channel comprises time slots 1410-1480 filled by the voice multiplexer/demultiplexer with data similar to the first bearer channel 1300. The first time slot 1410 is empty, i.e., no data was received with which to fill it. Time slots 1420 and 1430 are filled with data from voice call E transmitted at 16 kbps. Time slot 1440 is filled with signaling data associated with voice call E. Therefore, three time slots are consumed transmitting data associated with voice call E. The last four time slots 1450-1480 are filled with data from voice calls F-I, respectively, transmitted at 8 kbps.

The frame 1200 of data is input to the ISDN unit, which transmits the data to the high speed transceiver, which applies the data to the antenna system for transmission to the orbiting satellite. When the frame 1200 of data is received by the ISDN unit of the ground terminal adapter, the data is transmitted to the signaling combiner/splitter as well as the voice multiplexer/demultiplexer. The signaling combiner/splitter interprets the signaling instructions contained in, for example, time slots 1340 and 1350, and sends instructions to the voice multiplexer/demultiplexer for re-assembling the voice data from the received time slots. The voice multiplexer/demultiplexer reassembles the voice data based on the instructions received from the signaling combiner/splitter.

The voice multiplexer/demultiplexer transmits the voice data to the voice processing unit, which removes the added bit reversals to re-create the voice data stream in a data rate compatible for transmission to the cell phone network by the network interface. Therefore, the voice multiplexer/demultiplexer and the voice processing unit re-create the voice data in a 8 kbps format, for example, from the data transmitted in a single time slot 1310 for voice call A. For voice call B, the voice multiplexer/demultiplexer and voice processing unit recreate the voice data in a 13 kbps format from the data transmitted in time slots 1320 and 1330. The re-constructed voice call is transmitted to the cell phone network by the network interface, which renders the electrical signals from the voice processing unit and the signaling combiner/splitter, into radio frequency transmissions transmitted over the cell phone network. From the cell phone network, the radio frequency transmissions are received by the destination mobile terminal 1150.

In order to communicate in the reverse direction, the voice processing unit in the ground terminal adapter provides the inverse function of the voice processing unit in the mobile terminal adapter. Therefore, in order to process the incoming voice data coming from the satellite link over communications path 34, the voice processing unit removes the padded bit reversals inserted into the data stream by the voice processing unit on the other end of the communications loop for transmission on communications path 22. In order to prepare the frame of outgoing data 1200 for transmission to the satellite over communications path 36, the voice processing unit inserts the added bits into the data stream to form a signal consistent with the ISDN requirements, which will be removed by voice processing unit in the mobile terminal adapter upon reception from communications path 26.

Similarly, the voice multiplexer/demultiplexer in the ground terminal adapter provides the inverse function of the voice multiplexer/demultiplexer in the mobile terminal adapter when communicating in the reverse direction. For example, for the incoming data along communications path 34 coming from the satellite, the voice multiplexer/demultiplexer extracts the voice data arranged in time slots of the data frame 1200 by the voice multiplexer/demultiplexer for transmission over the ISDN communications path 22. For outgoing data along communications path 36, the voice multiplexer/demultiplexer assembles the voice data in the time slots of the data frame 1200, for extraction by voice multiplexer/demultiplexer after transmission over communications path 26.

Figure 5:
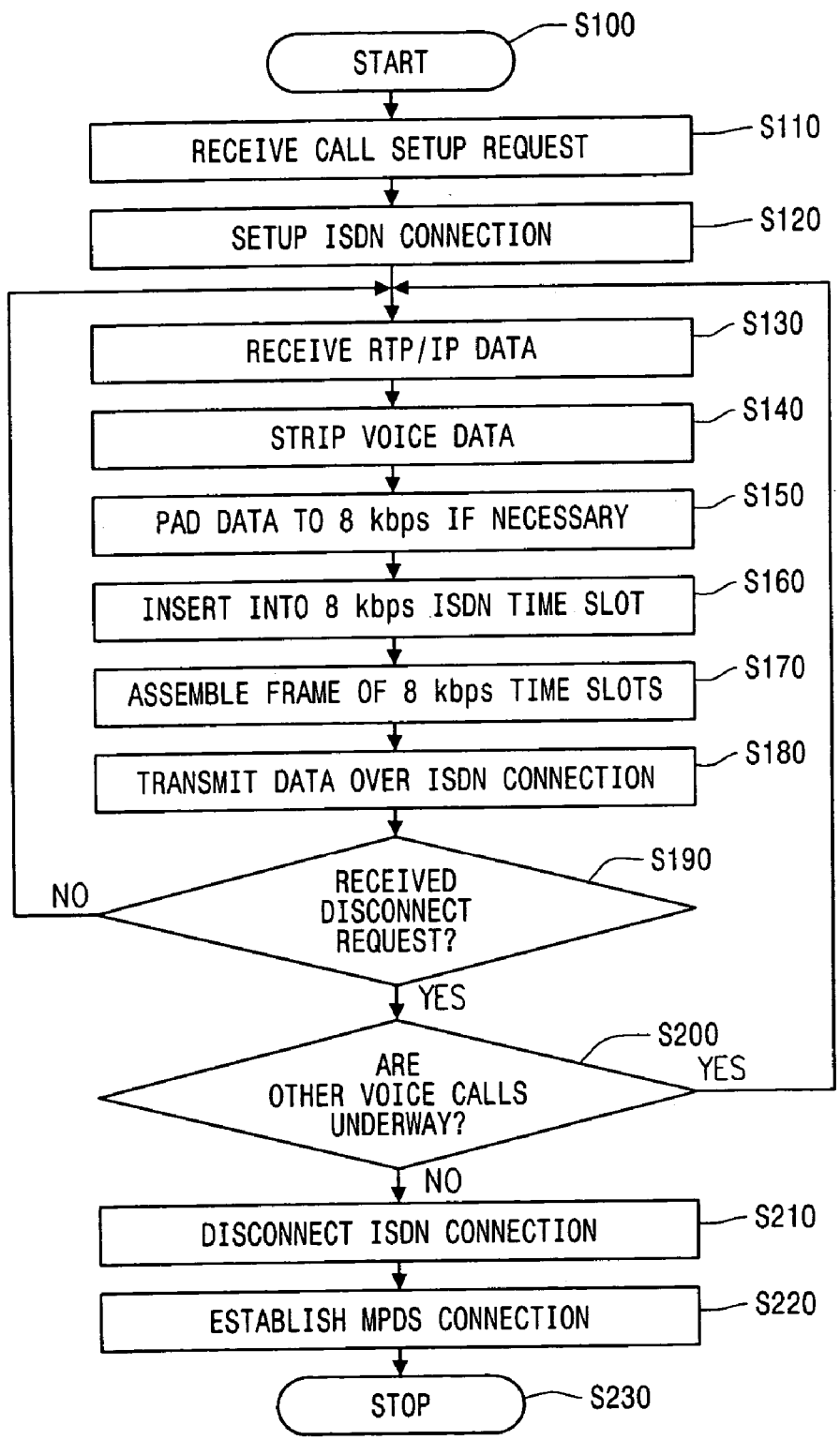
FIG. 5 is a flowchart outlining a method of operation of a first exemplary embodiment of the mobile platform communications system according to this invention.

FIG. 5 is a flow diagram outlining a first exemplary method of a mobile platform communications system according to this invention, using mobile terminals on board an aircraft. This exemplary method may use the uplink path of the communications route shown by reference numbers 22 and 24 in FIG. 1, for example. The method starts in step S100 and continues to step S110, where a call setup request is received.

The call setup request can be from a cell phone operated by a passenger or crew member on board the aircraft. The ISDN connection is then setup in step S120. In various exemplary embodiments, the ISDN connection is setup between the satellite transceiver and the satellite. In step S130, the RTP/IP data stream is received. In various exemplary embodiments, the RTP/IP data stream is received wirelessly from the cellular network across a cell phone transceiver interface. In step S140, the voice data is stripped from the IP headers, and in step S150, the stripped data is padded (if necessary) to create data to be transmitted at the 8 kbps data rate of the ISDN connection. The padded data is formatted into an 8 kbps time slot in step S160, and a plurality of time slots is arranged into a frame of ISDN data in step S170. In step S180, the data assembled in step S170 is transmitted over the ISDN connection. In various exemplary embodiments, the data is transmitted between the high speed transceiver on board the aircraft and the orbiting satellite.

In step S190, a determination is made whether a disconnect request has been received. If not, the control returns to step S1130, where additional data is received. If a disconnect request is received in step S190, a determination is made whether any other voice calls are presently underway. If so, control again returns to step S130 to receive additional RTP/IP data. If not, the ISDN connection is disconnected in step S210. Following the disconnection of the ISDN connection, an MPDS connection is established in step S220. In various exemplary embodiments, further communication between the aircraft and the orbiting satellite takes place using an MPDS connection rather than the more expensive ISDN connection. The process ends in step S230.

Figure 6:
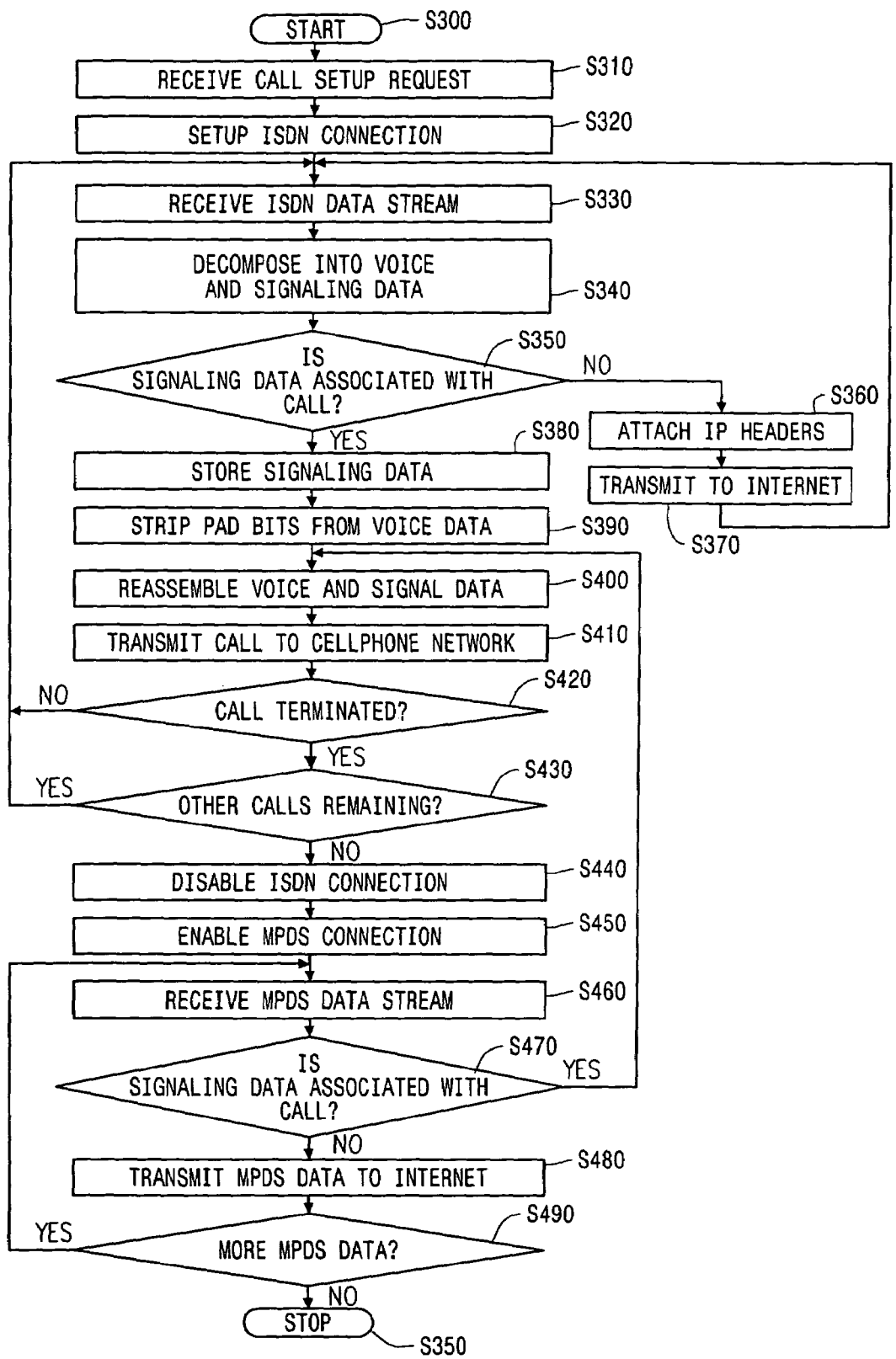
FIG. 6 is a flowchart further outlining a method of operation of a second exemplary embodiment of the mobile platform communications system according to this invention.

FIG. 6 is a flow diagram outlining an exemplary method for communicating between the orbiting satellite and the satellite base station. This exemplary method may use the downlink path of the communications route shown by reference numbers 32 and 34 in FIG. 1, for example. The method begins in step S300 and continues to step S310, wherein a call setup request is received. In various exemplary embodiments, the call setup request is received from the satellite by the satellite base station. In response to the request, an ISDN connection is established in step S320. In various exemplary embodiments, the ISDN connection is setup between the satellite base station and the orbiting satellite. In step S330, the ISDN data stream is received over the ISDN connection. In various exemplary embodiments, the ISDN data is received by the satellite base station. In step S340, the ISDN data is decomposed into voice data and signaling data. In step S350, a determination is made whether the signaling data separated from the data stream in step S340 is associated with the voice call, also separated from the data stream in step S340. If not, the signaling data is attached to an appropriate IP header in step S360, and then transmitted to a data network in step S370. In various exemplary embodiments, the network can be the Internet, or a business LAN or WAN.

If the signaling data is associated with the call, the signaling data is separated from the data stream and stored in step S380. The voice data is also separated from the data stream, and any padding bits are stripped from the voice data in step S390. In various exemplary embodiments, the pad bits are stripped from the voice data by the voice processing unit. In step S400, the voice data is re-assembled with the previously stored signaling data associated with the voice call, and the re-assembled data is formatted appropriately for whatever network will transmit the data. In various exemplary embodiments, the re-assembled data is formatted in GSM-compatible format. The re-assembled voice and signaling data is then transmitted to the cell phone network in step S410.

In step S420, a determination is made whether the ISDN call has been terminated. If not, control returns to step S330, and additional ISDN data is received. If the call has been terminated, a determination is made in step S430 whether other calls are remaining on the ISDN connection. If so, control again returns to step S330 to receive additional ISDN data. If no calls are remaining on the ISDN connection, the ISDN connection is terminated in step S440. In step S450, an MPDS connection is established, and MPDS data is received in step S460. Another determination is made in step S470 whether the data is associated with the voice call. If so, control returns to step S400, where the signaling data received from the MPDS connection is re-assembled with data received from the ISDN connection before transmitting to the cell phone network in step S410. If the MPDS data is not associated with a voice call, the data is transmitted to a data network in step S480. In various exemplary embodiments, the network may be the Internet or a business LAN or WAN. In step S490, a determination is made whether any more MPDS data is incoming on the MPDS connection. If so, control returns to step S460. If not, the method ends in step S500.

The mobile platform communications system was described primarily with air travel in mind. However, the mobile platform communications system may also operate when the aircraft is in motion on the ground, such as when the aircraft is taxiing on the runway before takeoff or after landing. In the same manner, the mobile platform communications system can operate when the aircraft is stationary on the ground, such as after boarding but prior to departure, and while awaiting authorization to take off. Whether the aircraft is in motion or stationary, or in the air or on the ground, the mobile platform communications system operates in the same manner.

Similarly, the mobile platform communications system can be installed on other forms of transportation, such as maritime transportation vehicles, and other forms of terrestrial transport, such as trains, buses, trucks, and the like, beyond the airborne mobile platform communications systems discussed herein.

While this invention has been described in conjunction with the exemplary embodiments outlined above, many alternatives, modifications and variations will be apparent based on the foregoing disclosure. For example, the invention has been described with reference to an application within the airline industry. However, the techniques disclosed herein may be applied to other situations, particularly those in which a host mainframe computer must communicate with a plurality of client units, which in turn communicate with a plurality of host mainframe computers. Accordingly, the exemplary embodiments of the invention as set forth above are intended to be illustrative, not limiting. Various changes may be made without departing from the spirit and scope of the invention.

What is claimed is:

1. An apparatus for transmitting a voice call via satellite from a mobile station to a destination station, comprising:
    a first data channel, the first data channel comprising an integrated services digital network connection;
    a second data channel, the second data channel comprising a mobile packet data system connection;
    a mobile terminal adapter that receives a voice call from a mobile station and processes the received voice call for transmission over the first data channel and the second data channel; and
    a first voice processing unit that inserts additional bits into the voice data when transmitting the voice data from the mobile terminal adapter to the satellite,
    wherein the mobile terminal adapter (1) divides the voice call into voice data and signaling data, the voice data being transmitted to and from the satellite using the first data channel, and the signaling data being transmitted to and from the satellite using the second data channel, and (2) activates the first data channel as needed for voice data transmission and deactivates the voice channel when not required for voice data transmission, and
    the first voice processing unit inserts an additional number of bits into the voice data to increase the data transmission rate of the voice data to one of 8 kbps or 16 kbps.

2. The apparatus of claim 1, further comprising a unit which charges for usage of the first data channel according to the duration of connect time.

3. The apparatus of claim 1, further comprising a unit which charges for usage of the second data channel according to the amount of transmitted data.

4. The apparatus of claim 1, wherein the first data channel comprises a time division multiplexing channel.

5. The apparatus of claim 4, wherein the voice data is transmitted in at least one time slot of the time division multiplexing channel.

6. The apparatus of claim 5, wherein at least one remaining time slot of the time division multiplexing channel is used to transmit at least one additional voice call.

7. The apparatus of claim 1, further comprising a second voice processing unit that removes the inserted additional bits from the voice data when transmitting the voice data from the satellite to the destination station.

8. The apparatus of claim 1, further comprising a voice multiplexer which assembles the voice data into time slots in a frame of data to be transmitted over the first data channel.

9. The apparatus of claim 8, further comprising a voice demultiplexer which extracts the voice data arriving in time slots in a frame of data over the first data channel into a stream of data.

10. A method for transmitting a voice call from a mobile station to a satellite, comprising:
    separating voice call data received from a mobile station into voice data and signaling data;
    accessing a first data channel, the first data channel comprising an integrated services digital network connection, and a second data channel, the second data channel comprising a mobile packet data system connection, for separately transmitting the voice data and the signaling data to the satellite, the second data channel being always activated for the transmission of data and the first data channel being selectively activated based on a determination that voice data is available to be transmitted;
    activating the first data channel only when the voice data is available to be transmitted;
    inserting additional bits into the voice data when transmitting the voice data from the mobile station to the satellite, the additional bits being added to increase the data transmission rate of the voice data to one of 8 kbps or 16 kbps:
    transmitting the voice data across the first data channel;
    transmitting the signaling data across the second data channel; and
    deactivating the first channel on completion of the transmission of the voice data.

* * * * *